[11] 3,602,683

[72] Inventors Hisashi Hishida;
Masakazu Maruyama, both of Hiratsuka, Japan
[21] Appl. No. 7,651
[22] Filed Feb. 2, 1970
[45] Patented Aug. 31, 1971
[73] Assignee Sumitomo Jukikai Kogyo Kabushiki Kaisha Tokyo, Japan
[32] Priority Feb. 3, 1969
[33] Japan
[31] 44/7305

[54] AUTOMATIC CONTROL MECHANISM FOR PLASMA WELDER
3 Claims, 10 Drawing Figs.
[52] U.S. Cl. ........................................................ 219/121 P,
219/125 R
[51] Int. Cl. .................................................... B23k 9/06
[50] Field of Search............................................ 219/131,
135, 121 P, 123, 125

[56] References Cited
UNITED STATES PATENTS
2,994,763   8/1961   Schultz........................ 219/123
3,102,946   9/1963   Fonberg....................... 219/123

*Primary Examiner*—J. V. Truhe
*Assistant Examiner*—J. G. Smith
*Attorney*—Sughrue, Rothwell, Mion, Zinn & Macpeak ABSTRACT: An automatic control device for plasma arc welding by use of a plasma torch fitted with a cathodic electrode and a gas blow nozzle, said torch being movable relative to a welding stock which is arranged as an anodic electrode, said device being characterized by the provision of a photoelectric sensor arranged to measure the inclination angle of the tail flame part of the plasma arc emerging from the backside of the welding stock while the welding operation is going on, the electric output signal from said sensor being fed to an electronic control circuit adapted for control of any one or more of the welding parameters such as the relative travel speed between the torch and the welding stock, the rate of plasma gas supply and the rate of the welding current.

R23~29 RESISTOR
C4~12 CONDENSER

AUTOMATIC CONTROL MECHANISM FOR PLASMA WELDER

This invention relates to improvements in and relating to an automatic control device for plasma arc welding.

The plasma arc welder is known per se which comprises a cathodic electrode fitted in a torch, on the one hand, and an anodic electrode constituting the stock to be welded, on the other hand, a high voltage being impressed between the both electrode and a main or central stream of rare gas such as argon and a concentric protecting gas stream consisting of an inert gas such as argon or the like being injected from the torch towards the welding stock. The main gas stream is heated up by the electric energy, into a welding plasma arc which is directed to the welding spot, as is commonly known. In place of the rare gases, air may be equally utilized as the working gas for the formation of the welding plasma.

A first advantage of the plasma arc welding is such that the fusion of the welding stock is carried into effect at an amazingly rapid speed thanks to the high flame temperature of the plasma, thereby attaining a substantially speeded-up welding. A second advantage of the plasma arc welding resides in a possibility of the formation of a fine and concentrated arc having a high energy density highly adapted for realizing a high-precision welding, in a highly favorable way substantially without inviting various conventional drawbacks as met in the old-fashioned electric welding, such as lateral shrinkage, angular deformation or the like defects in the welded stock.

It is the main object of the invention to provide an automatic control device for the plasma arc welder of the above kind, capable of operating in a highly sensitive way to the welding conditions occasionally being carried into effect, especially in the case of welding of heavy stocks.

It has been already ascertained that the physical conditions of the keyhole which is bored through the welding stock by the plasma flame during the welding procedure have a substantial influence upon the results of the welding. The optimum formation of the keyhole depends upon various parameters such as the relative travel speed of the torch, the flow rate of the plasma gas stream, the arc current, the thickness of the welding stock.

During the welding, the plasma penetrates through the welding stock for the formation of a keyhole, as was briefly referred to above, and a tail flame being observed as coming out of the outlet of the keyhole. It has been already proposed to measure the illuminance of such tail flame as a measure for the control of torch travel speed relative to the welding stock, so as to attain the optimum welding conditions. However, the illuminance of the plasma depends upon various and numerous other conditions which occasionally fluctuate and cannot be controlled, thus the delivered signal corresponding in any way to the controllable welding conditions and being resulted in failure.

We have investigated into the plasma arc welding procedures and found that when the inclination angle of the plasma tail flame is relied upon, as a sole parameter for the control of the torch-traveling speed or the like welding parameter or parameters.

As the control parameter, the relative travel speed of plasma torch, the feed rate of plasma gas stream, the arc current or the like may advantageously be adopted, although the invention is not limited only thereto.

Based upon the above observations, the invention in its broadest coverage resides in such an automatic control device for plasma arc welding, characterized by the provision of a photosensing means provided for unitary moving with a plasma torch relative to a welding stock, said photosensing means being arranged for measuring the inclination angle of the tail flame part of the welding plasma and the electric signal being fed to a welding parameter control means which is electrically connected with said measuring means.

These and further objects, features and advantages of the invention will become more apparent when read the following detailed description of the invention by reference to the accompanying drawings, in which.

Referring now to FIGS. 1–5, the main principles of the invention will be described in a rather simplified form.

Figure 1:
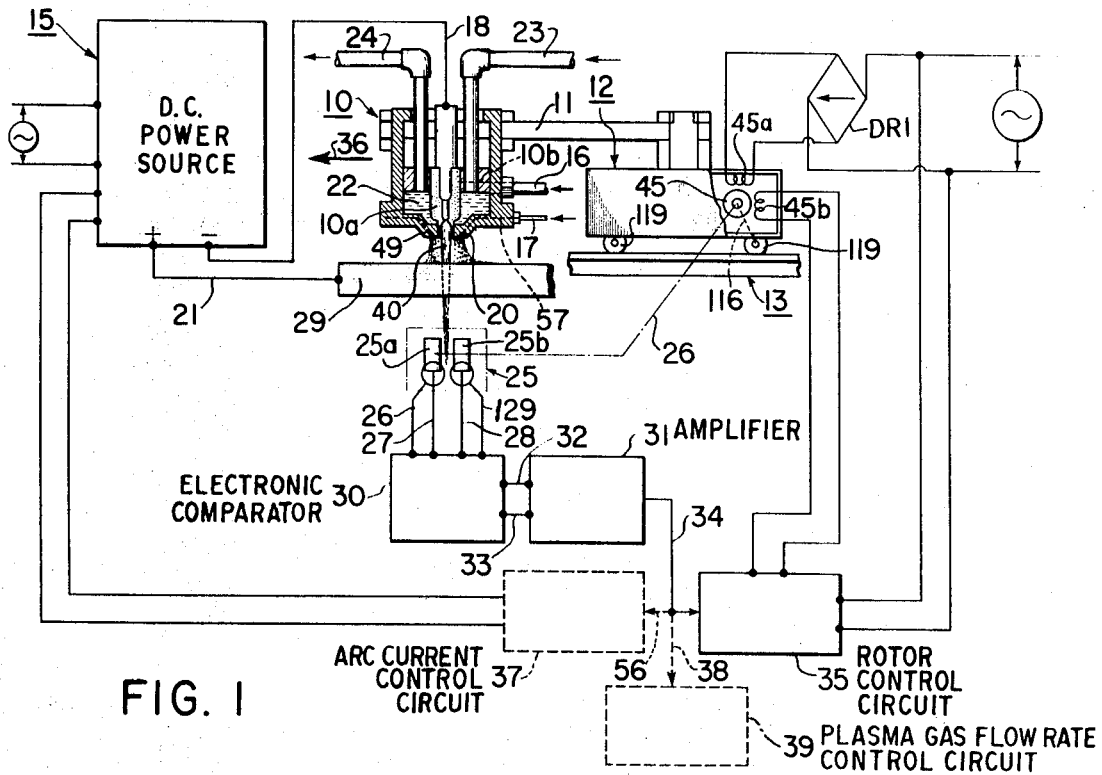
FIG. 1 is a partially sectioned schematic view of a plasma arc welder fitted with the automatic control device according to the invention.

In FIG. 1, the numeral 10 denotes generally a plasma torch unit of the conventional design which is attached fixedly at the free end of a rigid supporting arm 11 carried on a wheeled carriage 12, the latter being movable along guide rail means 13 shown only partially.

The carriage 12 is provided with traveling wheel means 119 mounted on said guide rail means 13, said wheel means being mechanically coupled through reduction gearing, not shown, with a DC drive motor 45. This mechanical coupling is shown only in a simplified way by a single dotted line at 116.

The torch unit 10 comprises as conventionally a tungsten cathode 14 which is electrically connected through a lead 18 with the negative side of a DC high-voltage source 15.

The unit 10 is formed with a gas chamber 10a which is connected through a conduit 10b, only shown in a simplified manner, by a dotted line, with a supply piping 16 connected in turn to an argon gas reservoir, not shown, for supply of plasma arc gas, as will be more fully described hereinafter. The arc gas may be argon, krypton, xenon, or a mixture of any of these rare gases, or alternatively air. An inert protecting gas, such as argon, is fed from a proper reservoir, not shown, through a separate supply piping 17 and a duct 57 shown only by a dotted line, to an auxiliary orifice 20 which is formed in the bottom wall of said torch unit 10 and around a main orifice 49 also bored through the same bottom wall.

Below the movable torch 10, there is provided a stationary welding stock 29 only schematically and partially shown, said stock being electrically connected through a lead 21 to the positive side of the power source 15, thus the stock being arranged to act as an anodic electrode. The inside diameter of the main orifice 49 is selected to 2 mm., as an example, and the distance between the bottom surface of the unit 10 and the welding stock 29 amounts, by way of example, to 7 mm. Within the unit 10, there is formed a cooling water chamber 22 which is connected with a water inlet tubing 23 and an outlet tubing 24 for the circulation of the coolant.

Below the stock 29 and apart several millimeters therefrom, there is a photoelectric angle measuring unit, generally shown at 25, which comprises a pair of photoelectric cells 25a and 25b, as most clearly be shown in FIG. 6. These cells are electrically connected through leads 26–29 to an electronic comparator 30 which is shown in FIG. 1 only by a rectangular block, but in a more specific way in FIG. 7. The output of the comparator 30 is connected through leads 32 and 33 to a conventional amplifier 31, shown only schematically in FIG. 1 by a block, but shown more specifically in FIG. 7. The output of this amplifier 31 is electrically connected through lead means 34 to rotor current control circuit 35 which is also shown more specifically in FIG. 7, this circuit being arranged to control the rotational speed of the motor 45 and thus the speed of the carrier 12 and the torch unit 10 which is traveling in this case from right to left in FIG. 1, as shown by an arrow 36.

As an optional measure, the output of the amplifier 31 is connected through lead means 34, 56 with an arc current control circuit 37, or through lead means 34, 38 with plasma gas flow rate control circuit 39, as will be more fully described hereinafter.

The welding stock 29 consists of two adjoining steel plates 29a and 29b, as more clearly be seen from FIGS. 2–5.

Figure 2:
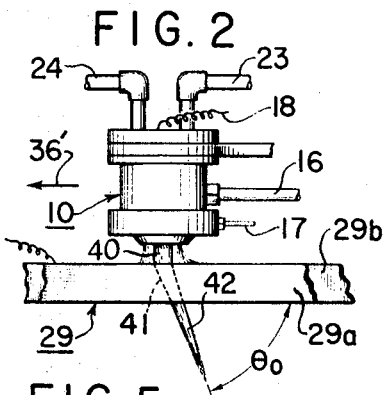
FIGS. 2–5 are several schematic views illustrative of the inclined angle of the tail flame part of welding plasma torch relative to a welding stock.

In FIG. 2, a standard plasma arc welding condition is schematically shown. The plasma arc 40 is shown as being delivered from the lower end of the torch unit 10 upon the welding stock 29 against a welding spot which movably formed along the confronting gap formed between the adjoining welding stock elements 29a and 29b, said arc penetrating through the stock 29 so as to form a rearwardly inclined keyhole 41, when assuming the unit 10 advancing in the direction shown by an arrow 36'. The numeral 42 represents the tail flame which forms a rearwardly inclined angle $\theta_0$.

Figure 3:
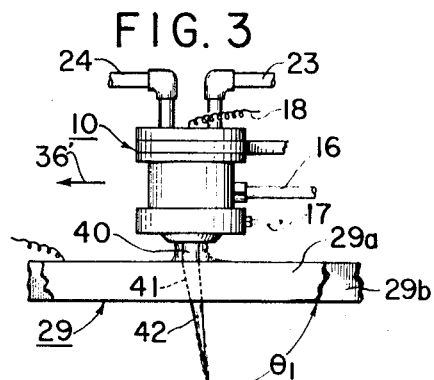

With the carriage 12 and the torch unit 10 traveling at a too much slower speed than that specified for the optimum welding conditions shown in FIG. 2, the inclined angle of the tail flame 42 will be increased to a larger value $\theta_1$ as shown in FIG. 3. In this case, a blown-off of the material of stock 29 may frequently encountered without attaining the desired welding effect. This angle $\theta_1$ will be substantially nearer to a right angle.

Figure 4:
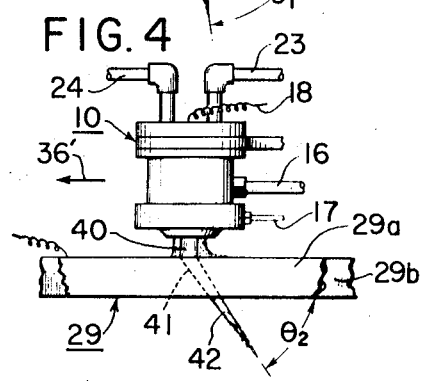
Figure 9:
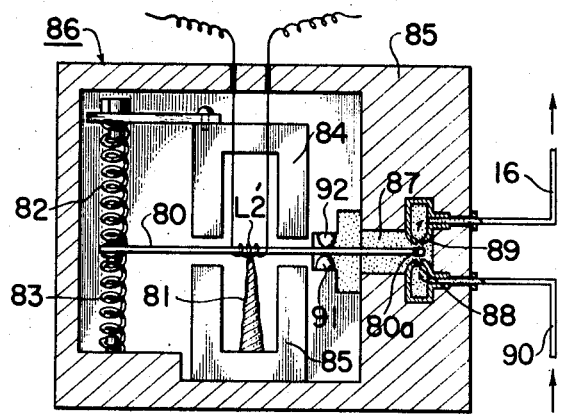
FIG. 9 is a schematic sectional view of a control valve assembly adapted for the control of the flow rate of plasma gas stream.

With a substantially larger traveling speed of the torch unit 10 carried by the carriage 12, the inclination angle will become a smaller value such as at $\theta_2$ shown schematically in FIG. 4.

From the foregoing, it will be clear that the following relation will be found among these several angular values:

$$\theta_2 < \theta_0 < \theta_1$$

In this case, the time period attributed to the fusing the welding material will become shorter than the properly allotted, and in extreme cases, no properly shaped keyhole will be produced.

Figure 5:
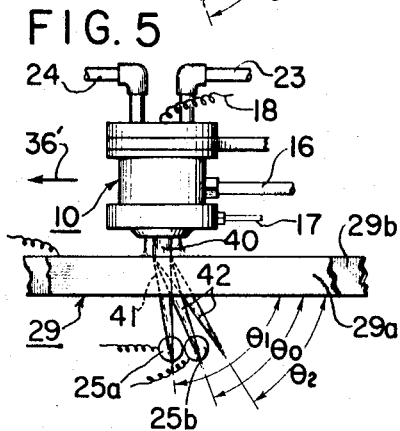

In FIG. 5, the aforementioned several working modes and the corresponding tail flame angles are shown in an overlapped manner. In this figure, the photoelectric cells 25a and 25b are so positioned that only the latter cell 25b senses the issuing light from the plasma tail flame having an inclination angle $\theta_0$ which corresponds to the optimum operating conditions, while the former element 25a is so positioned that it senses the light issuing from the tail flame having an inclination angle $\theta_1$ satisfying the following mathematical relation:

$$\theta_0 < \theta_1 \leq 90°$$

and corresponding to an unfavorable welding condition where the relative travel speed of the torch is too much higher than the specified value.

The relative position of the photoelements 25a and 25b is fixed and movable in synchronism of travel of the torch unit 10. For this purpose, these cells 25a and 25b are rigidly supported through a certain supporting member similar to that shown at 11 in FIG. 1, although not specifically shown, by the carriage 12, as hinted by a chain line 26.

Electric output from either of the photoelectric elements 25a and 25b is fed through amplifier 31 to control circuit 35. As will be more fully described hereinafter with reference to FIG. 7, when the first element 25a senses the light from the tail flame, the control circuit 35 operates in such a way that the travel speed of torch unit 10 is increased. On the other hand, when the second element 25b senses the light from the tail flame, the necessary control is carried out in the opposite sense which means that the torch travel speed is subjected to retardation.

Figure 6:
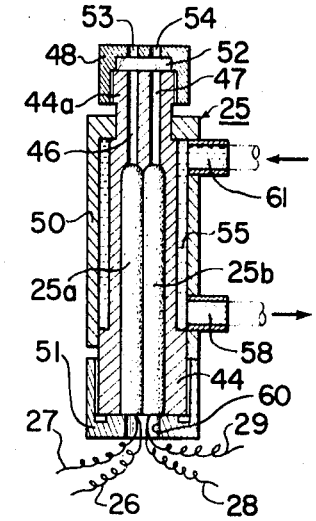
FIG. 6 is a substantially longitudinal section of a photosensing means comprising a pair of photocells designed and arranged to measure the inclination angle of plasma tail flame.

The photocell-type angle-measuring unit 25 is seen more specifically in FIG. 6. This unit 25 comprises said pair of photoelectric cells, as was referred to hereinbefore. In practice, these cells are in the form of phototransistors which are held in position by means of a holder 44 which is formed with two light beam guide passages 46 and 47 parallel to each other. The holder 44 is fitted with a top cover 48, a main casing and a bottom cap 51.

The top cap 48 is formed with a pair of light beam inlet openings 53 and 54 in vertical registration with said passages 46 and 47, respectively, and fitted through a filter piece 52 onto the top screwed end 44a by screwing. Between the main casing 50 and the holder 44, there is formed a cooling chamber 55 for effectively preventing any possible damage of the unit 25 by radiating heat energy from the plasma arc. For this purpose, the main casing is provided with a coolant inlet 61 and an outlet 58. Bottom cap 51 is formed with an opening 60 through which leads 26–29 are taken out from the phototransistors 25a and 25b.

It would be conceivable that there can be an intermediate position where light beams from the tail flame arrive at the inlets of both phototransistors. However, this cannot practically been realized, thanks to the directional design of the angle measuring unit 25. For this purpose, the provision of the light inlet openings 53, 54; the light filter 52 and the light beam guide passages 46, 47 having a longer length is highly effective. If such an intermediate operation position should occur, no practical effect will be impressed upon the control circuit 35, as will be more fully described hereinafter. The diameter of each of the phototransistors amounts generally to about 2.5 mm.; and the separating distance between them generally set to about 0.5 mm., although in FIG. 6 they are seen as if they are brought into lateral contact with each other. These dimensions can naturally be modified according to the thickness of the welding stock, torch travel speed, size of the plasma arc and the like various welding conditions. Since the diameter of the plasma amounts generally to about 2 mm., and the gap between the both phototransistors is selected to a highly smaller size such as 0.5 mm., as above referred to, there is no risk in practice that any light beam from the tail flame cannot arrive at the light inlets of the both transistors.

Next, referring to FIG. 7, the electric and electronic circuits employed in the automatic control device according to this invention will now be described.

In this figure, the photoelectric angle-measuring unit, briefly denoted as "angle sensor" includes said phototransistors 25a and 25b which may of the type: FPT 100 (General Motor Company's Standards which may apply equally other main circuit components). However, the sensitiveness of the first transistor 25a is selected stronger than the second transistor 25b, preferably in the ratio of 2:1, as an example. Two return leads 27, 28 from the both phototransistors are jointed to a junction 62 from which a common lead 63 extends through a resistor R1 to a further junction 64.

The lead 26 is electrically connected with a series of four transistors TR1 (type:2N217); TR2 (type:2N217); TR3 (type: 2N223) and TR4 (type: 2N223). Transistor TR1 has the same characteristic with that of the phototransistor 25a, and connected in circuit so as to balance out the dark current and for making necessary temperature compensation.

Transistors Tr2 and Tr3 are arranged for performing an amplification of the signal output from the first phototransistor 25a. The last stage transistor Tr4 is arranged to serve for the necessary temperature compensation of the preceding amplifier transistors Tr2 and Tr3.

The lead 29 from the second phototransistor 25b is connected equally as before with a series of four transistors Tr5, Tr6, Tr7 and Tr8. As may be easily supposed, the types and the arrangements of these transistors correspond respectively to the aforementioned transistors Tr1–Tr4, the operational conditions of which are controlled by various resistors R2–R5. In the similar way, the latter series of transistors Tr5–Tr8 are defined in their operational mode by a plurality of resistors R7–R11.

The output of the final stage transistor Tr4 of the upper amplifier section is conveyed to a junction 68 through a lead 67 which contains no resistor, while the output of the final stage transistor Tr8 is conveyed to the same junction 68 through a lead 66 which contains, however, a resistor R12 of 400 ohms selected in this case. Therefore, it will easily be seen that the signal output from the first phototransistor 25a can be conveyed in a more easy way to the output junction terminal 68 than in the case of the output from the second phototransistor 25b.

Figure 8:
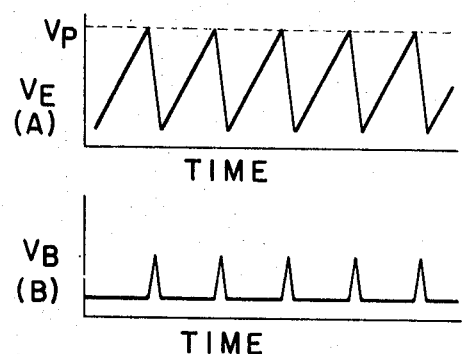
FIG. 8 is two diagrams illustrating the function of the pulse-generating section employed as a part of the circuit shown in FIG. 7 for control of the travel speed of a welding torch relative to a welding stock.

The voltage output from the amplifier section, so far described, of the comparator, is conveyed through a fixed resistor R13 and an adjustable resistor R14 to a condenser C1 for being charged therein and when the charged voltage to a certain value, $V_p$ shown in FIG. 8 and defined by the characteristics of a unijunction transistor Tr9, the condenser is discharged and so on, as shown at (A) in FIG. 8. The output from the unijunction transistor Tr9 is supplied to a transformer T1 and a corresponding series pulses is delivered therefrom through leads 70, 71 and 72 to a rectifier bridge circuit DR2.

The oscillator arrangement as well as the function of such or pulse generator which includes in this case aforementioned circuit elements: R13, R14, C1, Tr9, Tr1 and a further resistor R15, is well known to those skilled in the art and thus no further analysis will be necessary for better understanding the nature of the invention.

It should be, however, noted that the charging time of the condenser C1 depends upon the outputs from the first and the second phototransistors 25a and 25b, of which the output from the former is naturally stronger than that from latter.

Figure 7:
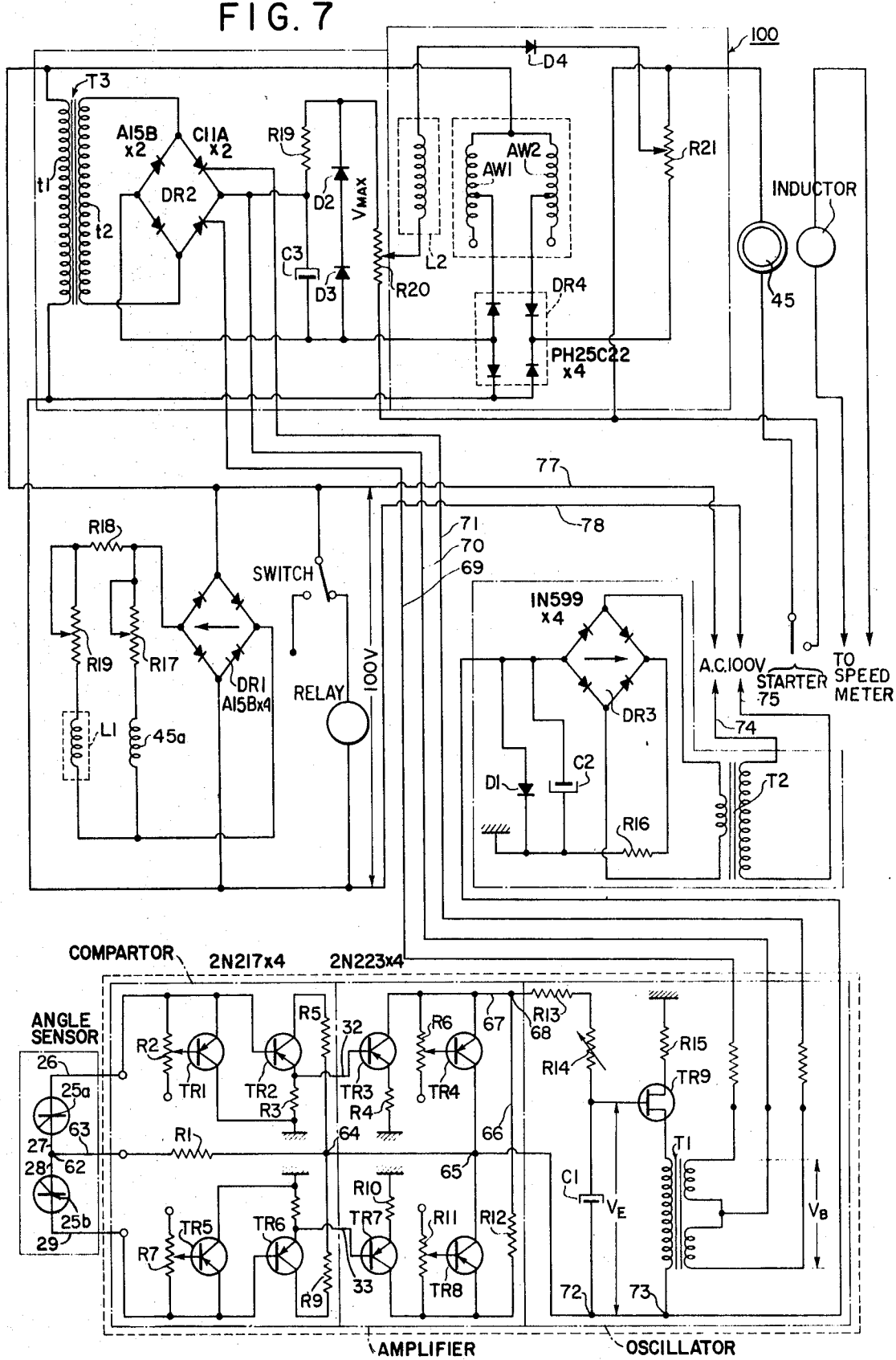
FIG. 7 is a connection diagram of an electric control circuit employed in the automatic control device according to this invention.

For the comparator schematically shown at 30 in FIG. 1 and comprising the amplifier and the oscillator so far shown and described, a DC power source is provided as shown in FIG. 7, said power source comprising a transformer T2 connected through leads 74, 75 to AC power source, 100 volts, as shown. The current from the secondary winding side, 12 volts as an example, is fed to a rectifier bridge DR3 from which an output lead 76 extending through several junctions 73, 72, 65 and 64 to the first junction 62 for effective feed of current to the necessary feeding points in the said comparator as shown. The DC power source contains several conventional circuit components such as fixed resistor T16, condenser C2 and diode D1, for ripple-removing and the like purposes as conventionally.

The AC power source is connected through leads 77 and 78 to a rectifier bridge DR1 which comprises, although not specifically shown, four diodes, A15B×4, the outlet therefrom being fed through an adjustable resistor R17 to the stator winding 45a of said drive motor 45 for the energization thereof. Resistors R18 and R17 are provided for the initial adjustment of the field coil 45a. In the neighborhood of the latter, there are provided an adjustable resistor R19 and a coil L1 connected in circuit as shown, these circuit elements serving as adjusting means for the control of the bias of a magnetic amplifier, generally shown at 100 in FIG. 7, which will be described in a more specific way hereinafter.

The AC 100-volt power is impressed from the AC power source through leads 77, 78 to the primary winding t1 of a transformer T3, the induced secondary voltage being fed to rectifier bridge DR2 which comprises four diodes, A15B×2 and C11A×2, the output from this rectifier bridge being controlled by the pulse series fed from the pulse generator including transformer T1, through lead means 69-71. Ripples contained in the output is suppressed by means of a condenser C3 which is connected in circuit, together with a fixed resistor R19 and diodes D2 and D3. In this circuit, the maximum $V_{max}$ shown in FIG. 7 is set to a certain fixed value, such as 80 volts.

The output from this constant maximum voltage circuit is conveyed to a control winding L2 which is arranged as magnetically coupled with working windings AW2 and AW1 of a self-saturating magnetic amplifier which comprises further a rectifier bridge DR4 containing four diodes (pH 25C 22/4— Siemens). Therefore, a controlled current will be fed to a control winding 45b of drive motor 45. Circuit elements D4, R20 and R21 are connected in circuit as shown.

Should both phototransistors 25a and 25b receive light from the tail flame, the first one 25a will act predominantly as was referred to, and thus the operation of the second phototransistor being neglected without prejudice.

When the first phototransistor 25a is energized, the more dense pulse series is delivered from the transformer T1 through lead means 69-71 to the bridge DR2. In this way, an intensified control current will be fed to control winding L2 and a correspondingly increased drive current will be fed from the magnetic amplifier 100 to the control winding 45b, thereby the drive motor speed and thus the travel speed of torch unit 10 relative to the stock 29 will be correspondingly increased.

On the other hand, when the second phototransistor 25b is energized, a more rough-pitch series of pulses is fed to the rectifier DR2 and thus the drive current to the motor 45 will be correspondingly retarded for speed-down of the travel speed of the torch unit 10.

It will be seen the arrangement can be modified so that the welding stock 29 travels in place of the torch unit 10.

The control mode is modified in such a way that the feed rate of plasma gas to the torch unit 10, in place of the travel speed of the carriage 12, is controlled by the output from either of the sensing phototransistors 25a and 25b.

For this purpose, a control coil L12' which is provided at the output part of the amplifier section shown in FIG. 7 by imaginary lines is mounted on a control bar 80 which is mounted pivotably at an intermediate point between the both ends of the bar and on the top of a conventional resilient mount 81. The root end of the bar 80 is kept in its balanced position, as shown, by a pair of balance springs 82 and 83. A pair of stationary magnetic pieces 84 and 85 are mounted within the housing at 85 of a gas flow control valve unit 86 which is formed with a gas chamber 87, the free end 80a of the pivotable control bar 80 extending into the gas chamber, so as to cooperate with either of reduced control openings 88 and 89 provided in the gas chamber in an opposite manner and separated a small distance from each other. The first control opening is fluidically connected through a feed piping 90 with a supply reservoir of the plasma gas or gas mixture, while the second control opening 89 is fluidically connected through feed piping 16 to the plasma torch unit 10. The bar 80 is sealed off by a pair of resilient sealing means 91 and 92 from the gas chamber 87.

According to the energization of either of said both phototransistors 25a and 25b, a higher or a lower control voltage is fed to the control winding L2', thus the plasma gas feed rate from its reservoir through feed piping 16 being controlled as the occasion demands.

Figure 10:
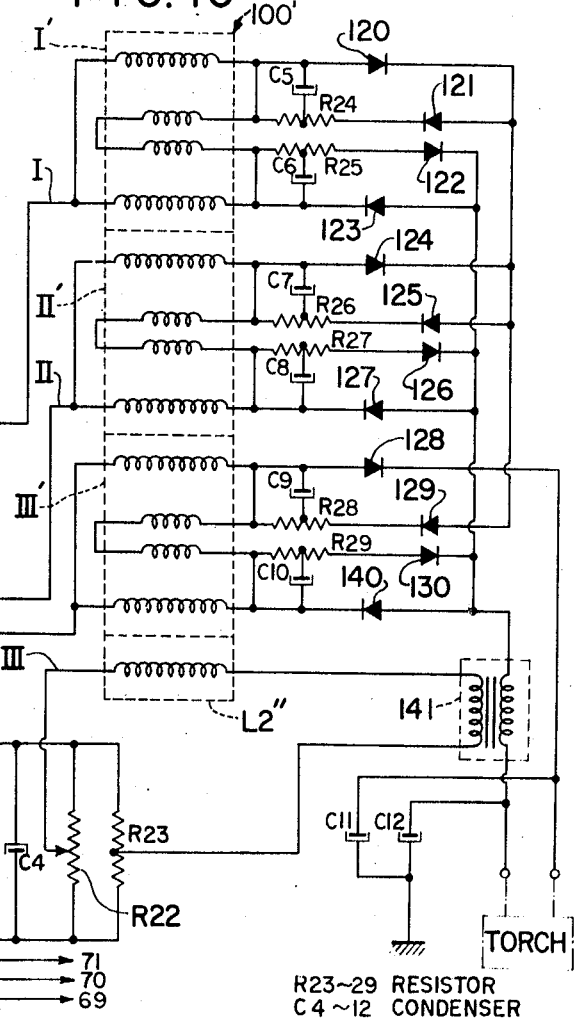
FIG. 10 is a connection diagram of a modified control circuit designed and arranged for control of the welding current in place of the torch travel speed.

For control of the welding current, the circuit arrangement shown in FIG. 10 is utilized.

The control pulse series is fed through lead means 69-71 to a rectifier bridge DR5 which is of the similar design and arrangement shown at DR2 in FIG. 7. AC current is fed from one of three phase windings L10, L11 and L12 to the primary winding t11 of a transformer T4 and the induced current in the secondary winding t12 of the same transformer T4 is fed to said rectifier bridge DR5, the output therefrom being fed through an adjustable resistor R22 to a control winding L2'' which is the control member of a magnetic amplifier 100', the latter being of the three-phase type. Windings L14-L16 are electromagnetically coupled with said three-phase (primary) windings L11-L13. The induced currents are fed through respective leads I, II and III to the respective component group I', II' and III', and upon rectified by passage through a plurality of diodes 120-140 and an arc-stabilizing unit 141 to the torch unit 10, for control of the arc current.

The embodiments of the invention in which an exclusive property or privilege is claimed are defined as follows:

1. In an automatic control device for plasma arc welding of a welding stock, comprising a plasma torch movable relative to the welding sock and along the welding seam; a DC voltage source; a cathodic electrode mounted within said torch and electrically connected with the negative side of said voltage source; said welding stock being electrically connected with the positive side of said voltage source for acting as an anodic electrode; and a plasma gas supply means fluidically connected to the interior space of said torch for the formation of a jet stream directed form said torch towards the welding stock, said jet stream being transformed into said plasma when electrical high potential is applied from said voltage source between said cathode and said anode; the improvements comprising in combination:
   1. photoelectric sensor means comprising a plurality of photoelectric elements, preferably phototransistors, arranged at a position apart a distance from the backside of said welding stock and substantially in opposition to said torch;
   2. an electric control means electrically connected with the output of said sensor means for receiving signal outputs from said photoelectric elements for comparison and for delivery of the thus compared result as a measure for control of a welding parameter;
   3. carrier means having a drive motor for carrying said torch and being guided to travel in the direction of said welding seam;
   4. a pulse generator electrically connected with said sensor means for the generation of a series of pulses, the pulse other hand; thereof being modified by the sensed output from said sensor means;
   5. a magnetic amplifier electrically connected with a power source on the one hand and with said motor on the other hand and
   6. a control winding connected electrically with said pulse generator and coupled with said magnetic amplifier for controlling the output from said amplifier to said drive motor for controlling the rotational speed of the latter.

2. The device as claimed in claim 1, further comprising a control valve unit inserted in a plasma gas feed piping for said torch, said valve unit comprising:
   1. a control winding electrically connected through amplifier means to said sensor means;
   2. a pivotable control bar acting as a control valve member adapted for control of the gaseous flow through said feed piping;
   3. a resilient mount provided within said valve unit and mounting said control bar at an intermediate point between the both ends thereof.

3. The device as claimed in claim 1, further comprising a magnetic amplifier arranged between said torch and a power source for the latter; and a control winding electrically connected with said sensor means and coupled with said amplifier, for control of the currents fed to said torch, according to the sensed angle of the tail flame of the plasma flame.